(12) United States Patent
Alesiani et al.

(10) Patent No.: US 11,799,655 B2
(45) Date of Patent: *Oct. 24, 2023

(54) METHOD FOR VERIFYING INFORMATION

(71) Applicant: NEC Corporation, Tokyo (JP)

(72) Inventors: Francesco Alesiani, Heidelberg (DE); Sebastian Gajek, Berlin (DE)

(73) Assignee: NEC CORPORATION, Tokyo (JP)

( * ) Notice: Subject to any disclaimer, the term of this patent is extended or adjusted under 35 U.S.C. 154(b) by 277 days.

This patent is subject to a terminal disclaimer.

(21) Appl. No.: 17/247,221

(22) Filed: Dec. 4, 2020

(65) Prior Publication Data
US 2021/0091953 A1     Mar. 25, 2021

Related U.S. Application Data

(63) Continuation of application No. 15/562,904, filed as application No. PCT/EP2015/057084 on Mar. 31, 2015, now Pat. No. 10,911,235.

(51) Int. Cl.
*H04L 9/00*     (2022.01)
*H04L 9/32*     (2006.01)
*G06F 17/16*    (2006.01)
*H04L 9/08*     (2006.01)
*H04L 9/30*     (2006.01)

(52) U.S. Cl.
CPC ............ *H04L 9/3218* (2013.01); *G06F 17/16* (2013.01); *H04L 9/0816* (2013.01); *H04L 9/3026* (2013.01)

(58) Field of Classification Search
CPC ... H04L 9/3218; H04L 9/0816; H04L 9/3026; H04L 9/3221; H04L 9/0819; G06F 17/16
See application file for complete search history.

(56) References Cited

U.S. PATENT DOCUMENTS 4,410,989 A * 10/1983 Berlekamp ........... H03M 13/15
                                                            714/762
4,821,268 A *  4/1989 Berlekamp ......... H03M 13/453
                                                            714/784

(Continued)

OTHER PUBLICATIONS

Militaru et al, On the Netwon's Iterative Method for the Charadterisitic Equation of Real Symmetric Matrix, 2006, IEEE, pp. 1-4. (Year: 2006).*

(Continued)

*Primary Examiner* — Philip J Chea
*Assistant Examiner* — Jenise E Jackson
(74) *Attorney, Agent, or Firm* — Leydig, Voit & Mayer, Ltd.

(57) ABSTRACT

A method for verifying information includes receiving a proof for a function to be evaluated from a proofer which has computed an output of the function. The proof is based on an evaluation key generated based on the function and a security parameter. Validity of the proof is verified based on a verification key generated based on the function and the security parameter. The function is defined as a mapping between matrix groups over a finite field and encoded into a polynomial that is described and implemented as an arithmetic circuit. The function to be evaluated is encoded such that the polynomial is a trace of a difference between the product of left and right input matrix polynomials of all gates of the arithmetic circuit and the output matrix polynomial of all gates of the arithmetic circuit.

20 Claims, 4 Drawing Sheets

(56) References Cited

U.S. PATENT DOCUMENTS

| | | | | |
|---|---|---|---|---|
| 4,845,713 | A * | 7/1989 | Zook | H03M 13/15 714/784 |
| 6,493,399 | B1 * | 12/2002 | Xia | H04L 1/06 375/296 |
| 6,550,035 | B1 * | 4/2003 | Okita | H03M 13/15 714/784 |
| 9,049,185 | B1 | 6/2015 | Papadopoulos et al. | |
| 9,350,543 | B2 * | 5/2016 | Kipnis | H04L 9/08 |
| 2009/0177591 | A1 | 7/2009 | Thorpe et al. | |
| 2013/0198854 | A1 | 8/2013 | Erway et al. | |
| 2015/0324604 | A1 | 11/2015 | Roy et al. | |
| 2018/0182036 | A1 | 6/2018 | Thorpe et al. | |

OTHER PUBLICATIONS

Cheng et al, Matrix Realignment Method for Calculating the Partial Transposes and The Partial Traces of Density Matrices, 2008, IEEE, pp. 647-651. (Year: 2008).*

Parno et al, Pinocchio: Nearly Practical Verifiable Computation, 2013, IEEE, pp. 238-252. (Year: 2013).*

U.S. Appl. No. 15/562,904, filed Sep. 28, 2017.

Fiore, Dario et al: "Publicly Verifiable Delegation of Large Polynomials and Matrix Computations, with Applications", International Association for Cryptologic Research,, vol. 20120529:200741, May 17, 2012 (May 17, 2012), pp. 1-25, XP061006205.

Parno, Bryan et al: "Pinocchio: Nearly Practical Verifiable Computation", Security and Privacy (SP), 2013 IEEE Symposium ON, IEEE, May 19, 2013 (May 19, 2013), pp. 238-252, XP032431327.

Zhang, Liang Feng et al: "Private Outsourcing of Polynomial Evaluation and Matrix Multiplication Using Multilinear Maps", Nov. 20, 2013 (Nov. 23, 2013), Advances in Communication Networking: $20^{th}$ Eunice/IFIP EG 6.2, 6.6 International Workshop, Rennes, France, Sep. 1-5, 2014, revised selected papers, [Lecture Notes in Computer Science, ISSN 1611-3349], Springer Verlag, DE, pp. 329-348, XP047044638.

Kumar, Amrit, "Algorithm-Based Secure Outsource of Matrix Computations Author", Oct. 26, 2013 (Oct. 26, 2013), XP055215321.

Groth, Jens, Ed-Shai Halevi: "Linear Algebra with Sub-linear Zero-Knowledge Arguments", Aug. 16, 2009 (Aug. 16, 2009), Advances in Cryptology—Crypto 2009, Springer Berlin Heidelberg, Berlin, Heidelberg, pp. 192-208, XP047029903.

Cheng, Wei et al, "Matrix Realignment Method for Calculating the Partial Transposes and the Partial Traces of Density Matrices," Nov. 2008, IEEE, pp. 647-651.

Militaru, Romulus, "On the Newton's Iterative Method for the Characteristic Equation of a Real Symmetric Matrix," Sep. 2006, IEEE, pp. 1-4.

* cited by examiner

METHOD FOR VERIFYING INFORMATION

CROSS REFERENCE TO RELATED APPLICATIONS

This application is a continuation of U.S. application Ser. No. 15/562,904 filed on Sep. 29, 2017 as a U.S. National Stage Application under 35 U.S.C. § 371 of International Application No. PCT/EP2015/057084 filed on Mar. 31, 2015. The International Application was published in English on Oct. 6, 2016, as WO 2016/155804 A1 under PCT Article 21(2). The entire disclosure of each of the foregoing applications is hereby incorporated by reference herein.

FIELD

The present invention relates to a method for verifying information, for example in a cloud computing system. The present invention further relates to a computing system, for example cloud computing system for verifying information.

BACKGROUND

Verifiable computation refers in general to a cryptographic protocol running between two parties, a proofer P and verifier V, with the aim to compute a proof or certificate of computation that a party given a function f and holding some potentially private input x has computed f(x). The cryptographic guarantees of the system are:
  Completeness: An honest proofer P computing f(x) from f and x convinces with overwhelming probability a verifier V of the fact that f(x) is computed properly.
  Soundness: A cheating proofer P having computed f'(x') not being equal to f(x) succeeds with negligible probability to convince the verifier of having computed f(x).
  Input Privacy (Zero-Knowledge): A malicious verifier V learns no information about the input x other than the fact that the proofer computed x.
  Function Privacy: The description of function f can be generated by a third party or jointly computed with a multi-party computation protocol such that the verifier does not learn f.
  Knowledgeably: The only way of having computed f(x) given f is by knowing the input x. In fact that means, x must have been stored in the memory of the proofer while computing the proof.

A possible setting demonstrating verifiable computation is cloud computing, as illustrated in FIG. 1. Here a resource-constraint device outsources a computational task to some powerful cloud and wishes the assurance of the correct computation.

One important application of verifiable computation is the evaluation of the quality of large data sets. Many service providers, e.g. social network providers, Internet and mobile network providers have access to huge amount of data and want to monetize their knowledge. Most importantly are statistics over data sets, such as consume or location behaviour. Verifiable computation allows a party to prove the correct computation of the statistics and probe the "quality of data" without revealing already the inputs. Depending on the quality the provider A1 can offer a price. The soundness property gives the buyer A5 the guarantee that the statistics were inferred over n data sets. The zero-knowledge property ensures that the buyer A5 learns nothing about the data entries.

In the non-patent literature of George Danezis, Cedric Fournet, Jens Groth, and Markulf Kohlweiss, "Square span programs with applications to succinct nizk arguments", Cryptology ePrint Archive, Report 2014/718, 2014, http://eprint.iacr.org/ and Helger Lipmaa, "Succinct non-interactive zero knowledge arguments from span programs and linear error-correcting codes", Cryptology ePrint Archive, Report 2013/121, 2013, http://eprint.iacr.org/ a span program was disclosed enabling a verification of Boolean functions.

In the further non-patent literature of Rosario Gennaro, Craig Gentry, Bryan Parno, and Mariana Raykova, "Quadratic span programs and succinct nizks without pcps", Cryptology ePrint Archive, Report 2012/215, 2012, http://eprint.iacr.org/ a verification of arithmetic functions was disclosed based on quadratic arithmetic programs, 'QAP' which detailed implementation was disclosed in the non-patent literature of Gentry and Parno, available under http://research.microsoft.com/pubs/180286/Pinocchio.pdf. Said method was applied to verify random access machine programs as disclosed in the non-patent literature of Eli Ben-Sasson, Alessandro Chiesa, Eran Tromer, and Madars Virza, "Succinct non-interactive zero knowledge for a von neumann architecture", Cryptology ePrint Archive, Report 2013/879, 2013, http://eprint.iacr.org/.

Further in the non-patent literature of Sanjeev Arora, Carsten Lund, Rajeev Motwani, Madhu Sudan, and Mario Szegedy, "Proof verification and the hardness of approximation problems", pages 501-555, 1998 probabilistic checkable proof systems are disclosed being proof systems with a 2-sided error. However, these systems are impractical, i.e. far away from practice.

In the non-patent literature of Yihua Zhang and Marina Blanton, "Efficient secure and verifiable outsourcing of matrix multiplications", Cryptology ePrint Archive, Report 2014/133, 2014, http://eprint.iacr.org/ and the related work mentioned therein proof systems are disclosed only addressing very special cases.

SUMMARY

In an embodiment, the present invention provides a method for verifying information. The method includes receiving a proof for a function to be evaluated from a proofer which has computed an output of the function. The proof is based on an evaluation key generated based on the function and a security parameter. Validity of the proof is verified based on a verification key generated based on the function and the security parameter. The function is defined as a mapping between matrix groups over a finite field and encoded into a polynomial that is described and implemented as an arithmetic circuit. The function to be evaluated is encoded such that the polynomial is a trace of a difference between the product of left and right input matrix polynomials of all gates of the arithmetic circuit and the output matrix polynomial of all gates of the arithmetic circuit.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
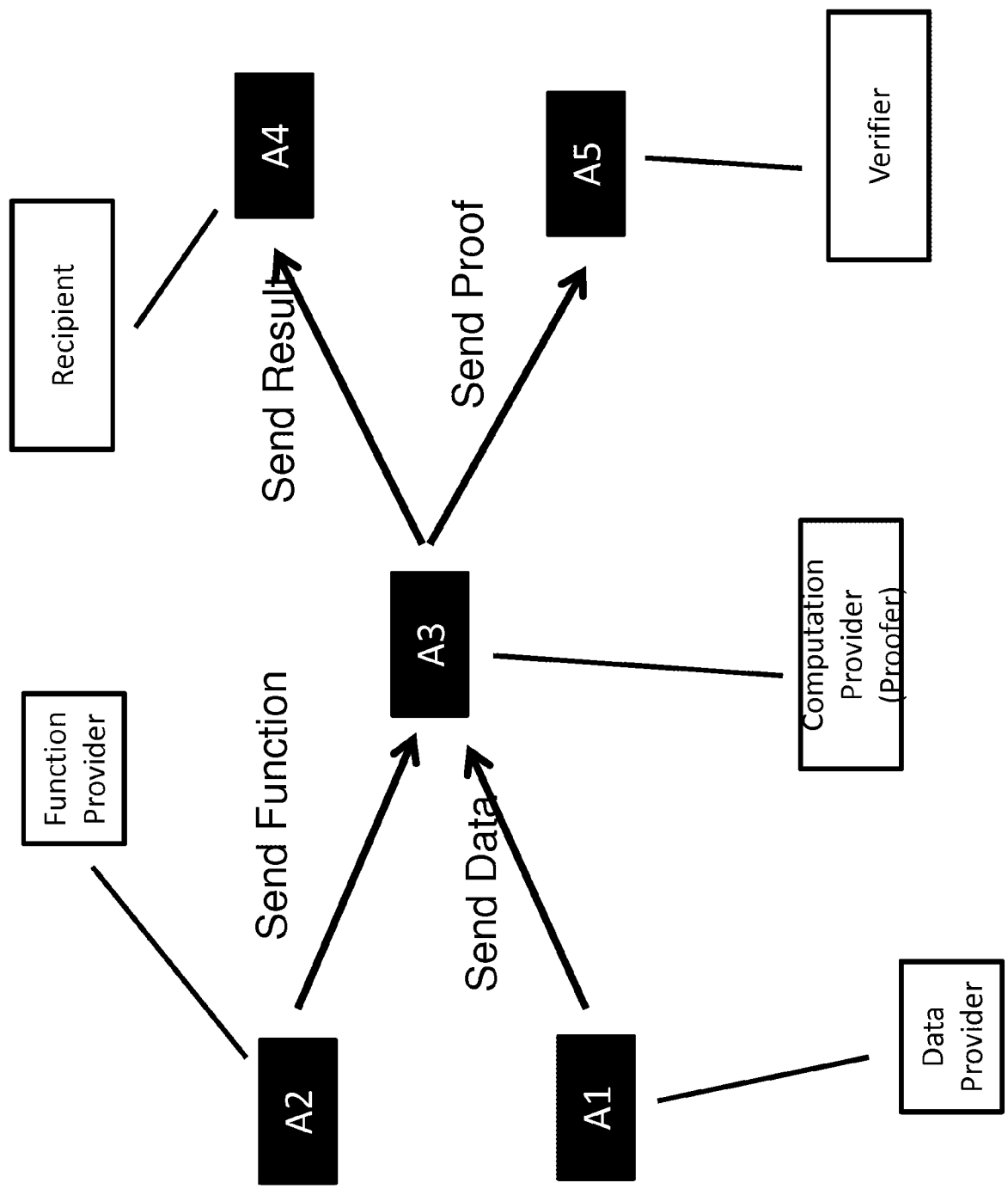
FIG. 1 shows a conventional cloud computing scenario.

Conventional methods for verifiable computation have significant problems. One problem is the computational cost of the verifier: The verifier approves correct computation. The verifier may simply compute the corresponding function alone and cross-check the results. However, if the complexity of computing is high and/or the size of the input x is large, for example the data base of billions of entries, or the input x has to be kept private, the trivial solution of self-computing them for verification is not applicable. Another problem is the limited flexibility in terms of which functions can be verified as well as in terms of applicability in different fields.

Embodiments of the present invention provide methods and systems for verifying information that reduce the computational costs of a verifier. In particular, embodiments of the present invention provide methods and systems for verifying information that enable a verifier to spend time resources sublinear to those of a proofer, i.e. providing a method and a system for verifying information being 'succinct.'

Embodiments of the present invention further provide a method and a system for verifying information which can be easily applied in different fields and allow for verification of information in particular in form of any polynomial function.

According to an embodiment, a method for verifying information is provided, e.g. in a cloud computing system, the method comprising, by means of one or more computation devices: generating an evaluation key and a verification key in a memory available to at least one of said computation devices based on a security parameter and a function to be evaluated by a key generator, computing an output of said function using an input in a memory available to at least one of said computation devices computing a proof for said outcome using said evaluation key in a memory available to at least one of said computation devices, and verifying if said proof is valid based on said verification key in a memory available to at least one of said computation devices, wherein said function is defined as a mapping between matrix groups over a finite field and encoded into a polynomial in a memory available to at least one computation device.

According to an embodiment, a computational system is provided comprising one or more computation devices communicating with each other and being operable and configured to: generate an evaluation key and a verification key in a memory available to at least one of said computation devices based on a security parameter and a function to be evaluated by a key generator, to compute an output of said function using an input in a memory available to at least one of said computation devices, to compute a proof for said outcome using said evaluation key in a memory available to at least one of said computation devices, and to verify if said proof is valid based on said verification key in a memory available to at least one of said computation devices, wherein said function is defined as a mapping between matrix groups over a finite field and encoded into a polynomial in a memory available to at least one computation device.

Although applicable to any kind of method or system for verifying information in general, the present invention will be described with regard to so-called verifiable computation.

Embodiments of the invention can significantly enhance flexibility for many computational models including linear programming, quadratic programming, convex programming and non-linear programming the present invention can be applied when the underlying functions are defined by polynomials over matrix groups. Embodiments of the present invention can be useful inter alia in machine learning, privacy-preserving computation of statistics, benchmarking verification, etc.

By performing the computations on matrix groups over fields, embodiments of the present invention can reduce the encoding of the computation from $O(q^3)$ polynomials to $O(q^2)$ polynomials.

Embodiments of the present invention can provide proofs that are probabilistically checkable.

Embodiments of the present invention can be more general and flexible compared with conventional methods and systems allowing computation of any polynomial-size function defined over a matrix group.

Embodiments of the present invention have a very wide area of applicability and can in particular be connected to vector computing where owner of big data centers can host outsourced computational power.

According to a preferred embodiment the function is encoded such that a target polynomial is generated being an element of said finite fields over the input which always divides said polynomial.

According to a further preferred embodiment the polynomial is described and implemented as an arithmetic circuit.

According to a further preferred embodiment the polynomial is the trace of a difference between the product of left and right input matrix polynomials of all gates of said arithmetic circuit and the output matrix polynomial of all gates of said arithmetic circuit.

According to a further preferred embodiment said input and output matrix polynomials are randomly shifted, 'MP-S', preferably by adding a product of said target polynomial with a random number to said input and output matrix polynomials.

According to a further preferred embodiment when computing said outcome a second polynomial is used with the input and same random information which is used for generating said keys.

According to a further preferred embodiment the proof is computed using said 'MP-S' dependent from said random information.

According to a further preferred embodiment for verifying said validity of the proof the correct structure of the arithmetic circuit is checked.

According to a further preferred embodiment for verifying said validity of the proof it is checked whether the target polynomial divides said MP-S.

According to a further preferred embodiment for verifying said validity of the proof the linear combinations computed over said MP-S are checked if they are in their corresponding spans.

According to a further preferred embodiment said input is private.

FIG. 1 shows a conventional cloud computing scenario. In FIG. 1 a provider A1 of the data sends data to a computation provider A3, i.e. a proofer. A function provider A2 sends a function to be computed also to the computation provider A3. The computation provider A3, for example a computation facility, performs computation of the provided function.

The result of the computation is sent to a user A4 for further evaluation of the result. The computation provider A3 further sends a proof to a verifier A5 which then needs to verify the result of the function by verifying the received proof.

Figure 2:
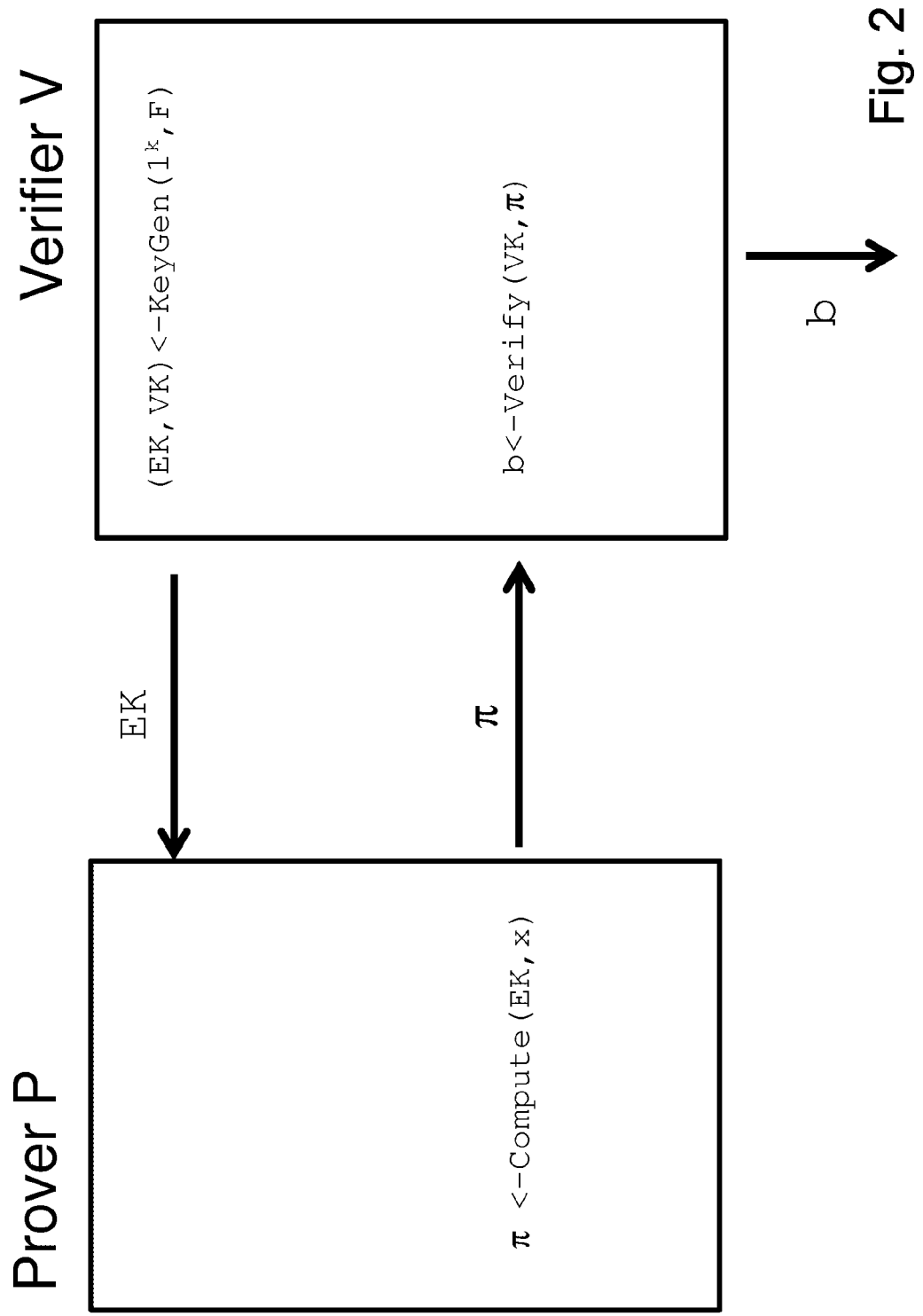
FIG. 2 shows steps of a method according to an embodiment of the present invention.

FIG. 2 shows a part of steps of a method according to a first embodiment of the present invention. In FIG. 2 an interaction between proofer P and verifier V to verify the computation of a function f(x) is shown. In the following definitions and notations are given: $[q]=1,\ldots,q$ denotes the set of integers between 1 and q, and $[q_0, q_1]=q_0, \ldots, q_1$ denotes the interval between $q_0$ and $q_1$.

$$M_q(\mathbb{F})=\mathbb{M}_q(\mathbb{F}_p)\subseteq \mathbb{F}_p^{q\times q}$$

Is the set of q×q matrices $A=(a_{ij})$ with elements $a_{ij}\in \mathbb{F}_p$. The identity matrix is denoted by $I_q$ where all element on the diagonal are 1 and the rest are zero. The transpose of the matrix is indicated by $A^T=(a_{ji})$ and the multiplication of two matrices A, B∈$M_q(F):M_q(F)\in M_q(F)\rightarrow M_q(F)$ is defined as $$AB = \left(\sum_{k\in[q]} a_{ik}b_{kj}\right)$$

and $A*B\in M_q(F)$ denotes the element-wise multiplication, i.e.

$$A*B=(a_{ij}b_{ij}), \forall i,j\in[q]$$

g is a generator of a group G of order p. Then $g^A$ denotes $$(g^{a_{ij}})_{i,j\in[q]}\in M_q(\mathbb{G})$$

Further A, B∈$M_q(F_p)$, then $(g^A)^B$ denotes $g^{A*B}=\in G^{q\times q}$ with i,j∈[q].

In the following the definition of a trace is given: A∈$G^{q\times q}$ is a square matrix. The trace of said matrix A, denoted as Tr{A}, is then defined as the linear operation $$\Sigma_{i=1}^q=A_{ii}$$

The trace induces an inner product <,> in $F^{q\times q}$. If A, B∈$F^{q\times q}$ then $<A, B>=Tr\{A^TB\}$, where $A^T$ is the transpose matrix of A. $B(F^{q\times q})=\{X_i\in F^{q\times q}, i\in[q^2]\}$ is a set of q matrices, where for every matrix $$X_i=\{x_{jk}^i\}_{j,k\in[q]}$$

such that $x^i_{jk}=1$ if $(j-1)q+k=i$, and 0 otherwise then $B(F^{q\times q})$ is a basis of $F^{q\times q}$. This can be seen by inspection, $$A=\Sigma_{i\in[q^2]}a_iX_i$$

for some $\{a_i\in F, i\in[q^2]\}$. Actually $a_i$ is the value of matrix A where the element of $X_i$ is non-zero. When $A\in F^{q\times q}$ is a matrix and $X_i\in B(F^{q\times q})$ is a basis then $A=\Sigma_{i\in[q^2]}a_iX_i$, where $a_i=Tr\{X^T_iA\}$, which can be seen from the following: The matrix product $X^T_iA$ yields a matrix with the j-th row comprising the k-th row of A. The diagonal element is the (j, k)-th element of the original matrix A. Thus the operation of $Tr\{X^T_iA\}=a_{jk}$. This is due to the fact that $Tr\{X^TA\}=<X,A>$ is the inner product in the space of $F^{q\times q}$ and using the expansion theorem: $A=\Sigma i<X_i,A>X_i$.

The previous considerations simply state that the set of matrices $X_i$ can be used to sample the original matrix A. From an information-theoretic point of view A and $\{Tr\{X^T_iA\}, i\in[q^2], X_i\in B(F^{q\times q})\}$ are equivalent.

In the following the quadratic arithmetic programs, 'QAP', according to the non-patent literature of Bryan Parno, Jon Howell, Craig Gentry, and Mariana Raykova, "Pinocchio: Nearly practical verifiable computation" in Security and Privacy (SP), 2013 IEEE Symposium on, pages 238-252, IEEE, 2013 or Rosario Gennaro, Craig Gentry, Bryan Parno, and Mariana Raykova, "Quadratic span programs and succinct nizks without pcps", in Advances in Cryptology-EUROCRYPT 2013, pages 626-645, Springer, 2013 are shown. QAPs are a way to encode a function described as an arithmetic circuit into a polynomial described by a set of polynomials for every wire of the arithmetic circuit. The quadratic arithmetic program QAP according to the non-patent literature of Rosario Gennaro, Craig Gentry, Bryan Parno, and Mariana Raykova, "Quadratic span programs and succinct nizks without pcps", in Advances in Cryptology-EUROCRYPT 2013, pages 626-645, Springer, 2013 is shown as follows: A QAP Q over a field F comprises three sets of m+1 polynomials $V=\{v_k(x)\}$, $W=\{w_k(x)\}$, $Y=\{y_k(x)\}$, for $k\in[m+1]$ and a target polynomial t(x). Further F is a function from $F^n$ to $F^{n'}$ and N=n+n'. Q "computes" F if there exists $c\in F^m$ such that $(c_1,\ldots,c_n)$ is the input, $(c_{n+1},\ldots,c_N)$ is the output and t(x) divides p(x), where $$p(x) = \left(v_0(x) + \sum_{k\in[m]} c_kv_k(x)\right)\left(w_0(x) + \sum_{k\in[m]} c_kw_k(x)\right) - \left(y_0(x) + \sum_{k\in[m]} c_ky_k(x)\right)$$

Since t(x) divides p(x), there exists a polynomial h(x), such that p(x)=h(x)t(x).

Building a QAP Q for an arithmetic circuit C is performed as follows: an arbitrary root $r_g\in F$ is picked for each multiplication gate g in C and the target polynomial is defined to be $t(x)=\Pi_g(x-r_g)$. An index $k\in[m]=\{1,\ldots,m\}$ to each input of the circuit and to each output from a multiplication gate of said circuit, wherein the addition gates will be compressed into their contributions to the multiplication gates. Finally the polynomials in V, W, and Y are defined by letting the polynomials in V encode the left input into each gate, the W encode the right input into each gate, and the Y encode the outputs. For example, $v_k(r_g)=1$ if the $k^{th}$ wire is a left input to gate g, and $v_k(r_g)=0$ otherwise. Similarly, $y_k(r_g)=1$ if the $k^{th}$ wire is the output of gate g, and $y_k(r_g)=0$ otherwise. Thus, if a particular gate g and its root $r_g$ is considered, the above equation simplifies to:

$$\left(\sum_{k=0}^m c_ky_k(r_g)\right) = \left(\sum_{k=0}^m c_kv_k(r_g)\right)\left(\sum_{k=0}^m c_k\omega_k(r_g)\right)$$

$$c_{output}\,|\,g = c_{left}\cdot c_{right}\,|\,g$$

which says that the output value of the gate is equal to the product of its inputs, the very definition of a multiplication gate. In short, the divisibility check that t(x) divides p(x) decomposes into deg(t(x)) separate checks, one for each gate g and root $r_g$ of t(x), that $p(r_g)=0$.

In the following a public verifiable computation method according to the non-patent literature of Rosario Gennaro, Craig Gentry, and Bryan Parno, "Non-interactive verifiable computing: Outsourcing computation to untrusted workers", in Advances in Cryptology—CRYPTO 2010, pages 465-482, Springer Berlin Heidelberg, 2010 is shown. Such a public verifier computation is also disclosed in the non-patent literature of Bryan Parno, Mariana Raykova, and Vinod Vaikuntanathan, "How to delegate and verify in public: Verifiable computation from attribute-based encryption", in Theory of Cryptography, pages 422-439, Springer, 2012.

When F is a function to be outsourced and u the input and y=F(u) the associated output then a public verifiable computation scheme VC comprises of a set of three polynomial-time algorithms VC=(KeyGen, Compute, Verify), defined as follow ($EK_F$, $VK_F$)←KeyGen(F, $1^\lambda$): Taking as input the function F to be evaluated and a security parameter λ, the procedure generates/computes the evaluation key $EK_F$ and the verification key $VK_F$ $(y, \pi_y) \leftarrow$ Compute($EK_F$, x): The worker computes the output $y=F(x)$ and the proof $\pi_y$ using the evaluation key $EK_F$ and the (private) input x $\{0, 1\} \leftarrow$ Verify($VK_F$, y, $\pi_y$): from the verification keys $VK_F$ and the proof $\pi_y$, the verifier checks whether $\pi_y$ is a valid proof for having computed $F(x)=y$ In the following in more detail an embodiment of the present invention is described:

1. Said embodiment of the present invention provides an encoding for efficiently verifying the computation of matrix multiplication and additions wherein the encoding following conventional QAP is called here the quadratic matrix program, 'QMP'. QAPs are defined over a finite field $F_p$ of (prime) order p. The matrix group over the field $F_p$ is not commutative, so it is not a field by itself. The results are extended to this context. This allows us to greatly simplify the QAP when matrix operations are involved.

2. Further a cryptographic protocol to verify the computation of QMPs, illustrated in FIG. 2 is given.

In the following a variant of QAPs with the property of probabilistically checking the computation of function F is described. The QMP is sampled by means of a matrix X and then compute the trace in order to get a polynomial $p(x, X)=h(x, X)t(x)$. A QMP Q over a matrix group $M_q(I_p)$ over the field $F_p$ comprises three sets of m+1 matrix polynomials $V=\{V_k(x)\}$, $W=\{W_k(x)\}$, $Y=\{Y_k(x)\}$, for $k \in [m+1]$, where $V_k(x), W_k(x), Y_k(x) \in M_q(F_p[x])$ and a target matrix polynomial $t(x) \in F_p[x]$. F is defined as a function from $M_q(F_p)^n$ to $M_q(F_p)^{n'}$ and let $N=n+n'$. Q "computes" F if there exist coefficients $C \in M_q(F_p)$ such that $(C_1, \ldots, C_N)$ is an assignment of the input and output wires, and if there exist coefficient matrices $(C_{N+1}, \ldots, C_m)$ such that for every $X \in M_q(F_p)$ it holds that $t(x)$ divides $p(x, X)$, where $$p(x, X) = Tr\left\{X^T\left(V_0(x) + \sum_{k \in [m]} C_k * V_k(x)\right)\left(W_0(x) + \sum_{k \in [m]} C_k * W_k(x)\right) - X^T\left(Y_0(x) + \sum_{k \in [m]} C_k * Y_k(x)\right)\right\}$$

$$= Tr\{X^T(V(x)W(x) - Y(x))\}$$

$$= Tr\{(V(x)W(x)X^T - Y(x)X^T)\}$$

$$= Tr\{(V(x)W(x)X^T)\} - Tr\{(Y(x)X^T)\}$$

$$= Tr\{(V(x)W^*(x))\} - Tr\{(Y^*(x))\}$$

where $V_k(x)$, $W_k(x)$, $Y_k(x)$ are matrix polynomials of the form $$V_k(x) = \sum_{i \in L_k} V_{ki} \delta(x, r_i)$$

$$W_k(x) = \sum_{i \in R_k} W_{ki} \delta(x, r_i)$$

$$Y_k(x) = \sum_{i \in O_k} Y_{ki} \delta(x, r_i)$$

with $L_k$, $R_k$, $O_k$ is the set of left, right and output gates in which the connection k is active. The delta functions are here the Lagrange polynomial $$\delta(x, r_i) = l_i(x) = \Pi_{j \in [d]} \frac{(x - r_j)}{(r_i - r_j)}$$

Since $t(x)$ divides $p(x, X)$, there exists a polynomial $h(x, X)$, such that $p(x, X) = h(x, X)t(x)$.

In the following a verifiable computation method allowing to verify a computation of a function is shown. One of the steps of this method is the encoding of the function as so-called pcQMP. The steps as mentioned with QAP, i.e. the key generation, the computation and the verification are also described in more detail for this embodiment of the present invention:

In the following F: $M(F)^n \to M(F)^{n'}$ is the verification function of an outsourced operation, where $N=n+n'$, $F_p$ is a field and $M(F_p)$ is the group of matrices on the field $F_p$ and further the associated pcQMP is $Q=(t(x), V, W, Y)$ of size m and degree d associated with F. Further $I_{mid}=[N+1, m]$ and $N_{i0}=[N]$, that corresponds to the indexes associated with the internal state of the arithmetic circuit or the input and output, while $I_0=[n]$ and $I_1=[n+1, n']$ are the indexes associated with the input and output connection of the circuit. $e: G \times G \to G_T$ is a non-trivial bilinear map and g a generator of G.

In the following the key generation is described in more detail: $(EK_F, VK_F)$ KeyGen(F, $1^\lambda$): starting from the function F the associated pcQMP is generated for some random sample $S \leftarrow M_q(F_p)$. Slightly abusing notation, it is assumed that the polynomials in W and Y are randomly shuffled, i.e. $W_k = W_k S$ for every $W_k \in W$ and similarly for the polynomials in Y. The procedure then selects some random elements $r_v$, $r_w$, s, $\alpha_v$, $\alpha_w$, $\alpha_y$, $\beta$, $\gamma \leftarrow F_p$ and sets $r_y = r_v r_w$, $g_v = g^{r_v}$, $g_w = g^{r_w}$ and $g_y = g^{r_y}$. The evaluation key EKE is generated according to $$EK_F = \left(\{g_v^{V_k(s)}\}_{k \in I_{mid}}, \{g_w^{W_k(s)}\}_{k \in I_{mid}},\right.$$

$$\{g_y^{Y_k(s)}\}_{k \in I_{mid}}, \{g_v^{\alpha_v V_k(s)}\}_{k \in I_{mid}},$$

-continued $$\{g_w^{\alpha_w W_k(s)}\}_{k \in I_{mid}}, \{g_y^{\alpha_y Y_k(s)}\}_{k \in I_{mid}},$$

$$\left.\{g^{s^i}\}_{i \in [d]}, \{g_v^{\beta V_k(s)} g_w^{\beta W_k(s)} g_y^{\beta Y_k(s)}\}_{i \in [d]}\right)$$

while the verification key is set as $$VK_F = \left(g, g^{\alpha_v}, g^{\alpha_w}, g^{\alpha_y}, g^{\gamma}, g^{\beta\gamma}, g_y^{t(s)}, \{g_v^{V_k(s)}, g_w^{W_k(s)}, g_y^{Y_k(s)}\}_{k \in \{0\} \cup [N]}\right)$$

In the following the Computation of F is described in more detail: $(y, \pi_y)$ Compute($EK_F$, x): The worker computes $y=F(x)$, using the coefficient of the pcQMP $\{C_i\}_{i \in [m]}$ and then resolve for $h(x, S)$ such that $p(x, S)=h(x, S)t(x)$ and computes the proof as $$\pi_y = \left(g_v^{V_{mid}(s)}, g_w^{W_{mid}(s)}, g_y^{Y_{mid}(s)}, g^{h(s)}, g_{mid}^{V'} = g_v^{\alpha_v V_{mid}(s)},\right.$$

-continued $$g^{W'_{mid}} = g_w^{\alpha_w W_{mid}(s)}, g^{Y'_{mid}} = g_y^{\alpha_y Y_{mid}(s)}, g^z = g_v^{\beta V_{mid}(s)} g_w^{\beta W_{mid}(s)} g_v^{\beta Y_{mid}(s)}$$

where $V_{mid}(X) = \Sigma_{k \in Imid} C_k * V_k(x)$, $V(x) = V_0(x) + \Sigma_{k \in [m]} C_k * V_k(X)$, $W(X) = W_0(X) + \Sigma_{k \in [m]} C_k * W_k(x)$ and $Y(s) = Y_0(x) + \Sigma_{k \in [m]} C_k * Y_k(s)$. The computation is done directly in the exponent, e.g.

$$g^{V(s)} = g^{V_0(s)} \prod_{k \in [m]} \left(g^{V_k(s)}\right)^{C_k}$$

In the following the verification is described in more detail:

(0, 1)←Verify(VK$_F$, x, y, π$_y$): The verifier checks using the bilinear map e and the verification key VK$_F$, if:
QAP C satisfies the divisibility check: Compute from the verification key $VK_F g_v^{V_{io}(s)} = \Pi_{k \in [N]} (g_v^{V_{k(s)}})^{C_k}$ (and similarly for $g_w^{W_{io}(s)}$ and $g_y^{Y_{io}(s)}$) and check:

$$Tr\left\{e\left(g_v^{Y_0(s)} g_v^{Y_{io}(s)} g_v^{Y_{mid}(s)}, g_w^{W_0(s)} g_w^{W_{io}(s)} g_v^{W_{mid}(s)}\right)\right\} =$$
$$e\left(g_y^{t(s)}, g_y^{h(s,S)}\right) Tr\left\{e\left(g_y^{Y_0(s)} g_y^{Y_{io}(s)} g_y^{Y_{mid}(s)}, g\right)\right\}$$

Check that the linear combinations computed over V, W and Y are in their appropriate spans:

$$e\left(g_v^{V'_{mid}}, g\right) = e\left(g^{V_{mid}}, g^{\alpha_v}\right),$$
$$e\left(g_w^{W'_{mid}}, g\right) = e\left(g^{W_{mid}}, g^{\alpha_w}\right), e\left(g_y^{Y'_{mid}}, g\right) = e\left(g^{Y_{mid}}, g^{\alpha_y}\right)$$

Check that the same coefficients were used in each of the linear combination over V, W, and Y:

$$e(g^z, g^y) = e\left(g_v^{V_{mid}} g_w^{W_{mid}} g_y^{Y_{mid}}, g^{\beta_y}\right)$$

Figure 3:
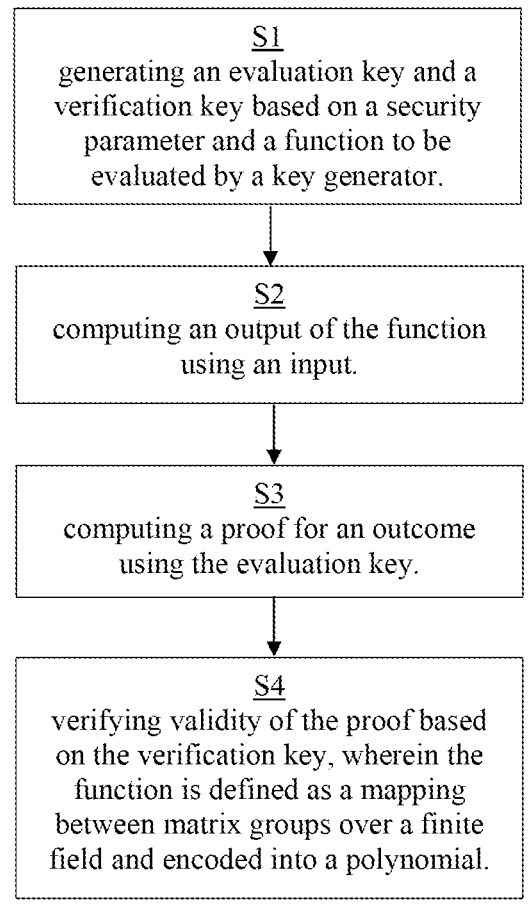
FIG. 3 shows steps of a method according to an embodiment of the present invention.

FIG. 3 shows steps of a method according to a second embodiment of the present invention. In FIG. 3 steps of a method for verifying information are shown. The method comprising by means of one or more computation devices the following steps: The first step S1 comprises generating an evaluation key and a verification key in a memory available to at least one of said computation devices based on a security parameter and a function to be evaluated by a key generator. The second step S2 comprises computing an output of said function using an input in a memory available to at least one of said computation devices. The third step S3 comprises computing a proof for said outcome using said evaluation key in a memory available to at least one of said computation devices, and the fourth step S4 comprises verifying if said proof is valid based on said verification key in a memory available to at least one of said computation devices, wherein said function is defined as a mapping between matrix groups over a finite field and encoded into a polynomial in a memory available to at least one computation device. These steps may be performed by different computation devices or computing entities.

Figure 4:
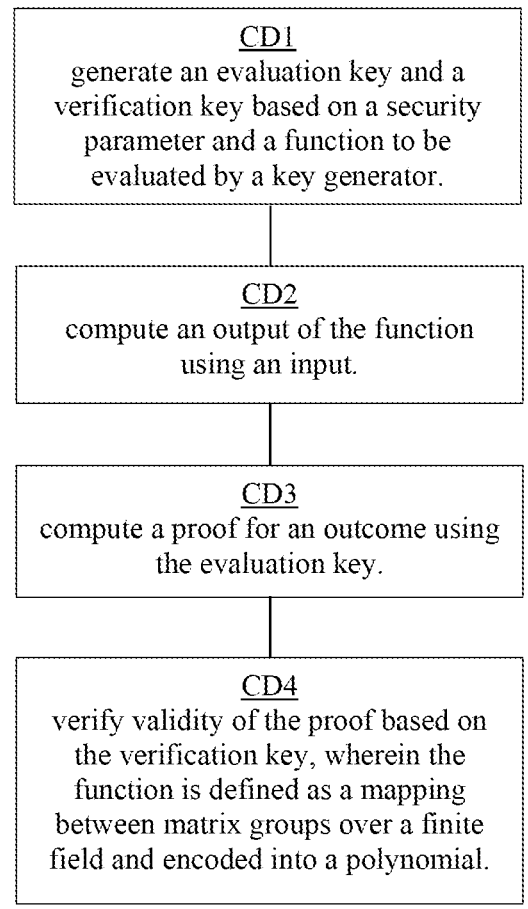
FIG. 4 shows a computing system according to an embodiment of the present invention.

FIG. 4 shows a computing system according to a third embodiment of the present invention. In FIG. 4 a computing system comprising a plurality of computation devices CD1, CD2, CD3, CD4 are shown. The first computation device CD1 is configured to generate an evaluation key and verification key in a memory available to at least one of said computation devices based on a security parameter and a function to be evaluated by a key generator.

The second computation device CD2 is configured to compute an output of said functional using an input in a memory available to at least one of said computation devices.

The third computation device CD3 is configured to compute a proof for said outcome using said evaluation key in a memory available to at least one of said computation devices.

The fourth computation device CD4 is configured to verify if said proof is valid based on said verification key in a memory available to at least one of said computation devices, wherein either computation devices CD1, CD2, CD3, CD4 said function is defined as a mapping between matrix groups over a finite field and encoded into a polynomial in a memory available to at least one computation device.

According to an embodiment of the present invention: a verification paradigm over matrix group that allows to verify a polynomial evaluation efficiently. Conventional methods can be applied to matrix polynomials but not natively in the group of Matrix, since the matrix group is not commutative. In particular the trick to verify computation over Matrix groups is to compute the trace to define an inner product inside the matrix group; and a construction of sampling matrices reducing the complexity to constant time with respect to the matrix group size. In particular the trick here is that the sampling can be of special shape in order to reduce computational complexity.

Embodiments of the present invention can enable an implementation of a complex matrix problem over a cloud system leaving to the verifier constant time verification problem which is practical for all polynomial time-computable functions.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for verifying information, the method comprising:
   receiving a proof for a function to be evaluated from a proofer which has computed an output of the function, the proof being based on an evaluation key generated based on the function and a security parameter; and verifying validity of the proof based on a verification key generated based on the function and the security parameter, wherein the function is defined as a mapping between matrix groups over a finite field and encoded into a polynomial that is described and implemented as an arithmetic circuit, and wherein the function to be evaluated is encoded such that the polynomial is a trace of a difference between the product of left and right input matrix polynomials of all gates of the arithmetic circuit and the output matrix polynomial of all gates of the arithmetic circuit.

2. The method according to claim 1, wherein the function to be evaluated is encoded such that a target polynomial is generated belonging to the finite field over the input which always divides the polynomial.

3. The method according to claim 2, wherein the input and output matrix polynomials are randomly shifted by adding a product of the target polynomial with a random number to the input and output matrix polynomials.

4. The method according to claim 3, wherein the proof has been computed using the randomly shifted input and output matrix polynomials dependent from the random number.

5. The method according to claim 3, wherein verifying the validity of the proof includes checking whether the target polynomial divides the randomly shifted input and output matrix polynomials.

6. The method according to claim 3, verifying the validity of the proof includes checking linear combinations computed over the randomly shifted input and output matrix polynomials to determine whether the linear combinations are in corresponding spans.

7. The method according to claim 1, wherein the function has been computed using a second polynomial, a private input and random information which was used for generating the evaluation key and the verification key.

8. The method according to claim 7, wherein the proofer and a verifier which verifies the validity of the proof are computation devices in a cloud computing environment.

9. The method according to claim 1, wherein verifying the validity of the proof includes checking whether the arithmetic circuit has a correct structure.

10. The method according to claim 1, wherein the evaluation key and the verification key are generated by a verifier that verifies the validity of the proof.

11. A verifier for verifying information comprising a computation device including one or more processors and access to memory which is configured to facilitate execution of the following steps:

receiving a proof for a function to be evaluated from a proofer which has computed an output of the function, the proof being based on an evaluation key generated based on the function and a security parameter; and verifying validity of the proof based on a verification key generated based on the function and the security parameter, wherein the function is defined as a mapping between matrix groups over a finite field and encoded into a polynomial that is described and implemented as an arithmetic circuit, and wherein the function to be evaluated is encoded such that the polynomial is a trace of a difference between the product of left and right input matrix polynomials of all gates of the arithmetic circuit and the output matrix polynomial of all gates of the arithmetic circuit.

12. The verifier according to claim 11, wherein the function to be evaluated is encoded such that a target polynomial is generated belonging to the finite field over the input which always divides the polynomial.

13. The verifier according to claim 12, wherein the input and output matrix polynomials are randomly shifted by adding a product of the target polynomial with a random number to the input and output matrix polynomials.

14. The verifier according to claim 13, wherein the proof has been computed using the randomly shifted input and output matrix polynomials dependent from the random number.

15. The verifier according to claim 13, wherein verifying the validity of the proof includes checking whether the target polynomial divides the randomly shifted input and output matrix polynomials.

16. The verifier according to claim 13, verifying the validity of the proof includes checking linear combinations computed over the randomly shifted input and output matrix polynomials to determine whether the linear combinations are in corresponding spans.

17. The verifier according to claim 11, wherein the function has been computed using a second polynomial, a private input and random information which was used for generating the evaluation key and the verification key.

18. The verifier according to claim 11, wherein the verifier is part of a cloud computing environment.

19. The verifier according to claim 11, wherein verifying the validity of the proof includes checking whether the arithmetic circuit has a correct structure.

20. The verifier according to claim 11, wherein the verifier is further configured to generate the evaluation key and the verification key.

* * * * *